US005759328A

United States Patent [19]

Richwine et al.

[11] Patent Number: 5,759,328

[45] Date of Patent: Jun. 2, 1998

[54] MULTI-SIDED NOVELTY PIECE AND METHOD FOR MAKING THE SAME

[75] Inventors: James D. Richwine, Santa Monica; Sanford K. Otsuji, Mission Viejo; Rebecca L. Forsythe, Topanga; David J. Rosendale, Torrance; Craig R. Evans, Cypress, all of Calif.

[73] Assignee: Intervisual Communications Inc., Santa Monica, Calif.

[21] Appl. No.: 766,164

[22] Filed: Dec. 12, 1996

[51] Int. Cl.[6] .................... B32B 31/18

[52] U.S. Cl. .................... 156/227; 156/250; 156/277; 156/291; 446/150

[58] Field of Search .................... 428/121, 136, 428/195; 446/149, 150; 40/445; 156/227, 250, 277, 291

*Primary Examiner*—Alexander Thomas

*Attorney, Agent, or Firm*—Gerald L. Price

[57] ABSTRACT

A novelty piece is fabricated from a single sheet of paper printed on both sides with four separate sets of indicia. Fold lines and cut lines are provided at predetermined positions and an adhesive is applied at preselected locations and the sheet is then folded. After the adhesive sets, the pieces are cut out ready for use. The final piece can be folded in a first position showing one face or side, opened to a second position showing a different face or side, opened to a third position slowing still another different face or side, and finally opened to a fourth position showing another different face or side.

5 Claims, 7 Drawing Sheets

MULTI-SIDED NOVELTY PIECE AND METHOD FOR MAKING THE SAME

BACKGROUND OF THE INVENTION

1. Field of the Invention

The invention relates to novelty pieces; and, more particularly, to a single novelty piece adapted to present four differing faces or sides, and a method for making the same.

2. Description of the Prior Art

Novelty pieces are well known in the art. Such pieces may be found as prizes in cereal boxes or caramelized popcorn boxes. These pieces may have a single scene thereon, or a scene on each side. The novelty of such pieces quickly wears off. There is a need for a novelty piece that can present four sides or faces in a single piece by merely folding the same in different orientations. A simple efficient method for making the same is necessary.

SUMMARY OF THE INVENTION

It is an object of this invention to provide a novelty piece which can be folded in different orientations to present a plurality of different sides or faces.

It is another object of this invention to provide a method for making a plurality of the pieces of the foregoing object.

It is still another object of this invention to carry out the foregoing objects wherein the different sides or faces being presented may have a recurring theme.

These and other objects are preferably accomplished by providing a novelty piece cut from a single sheet of paper or other flexible printable substrate having both sides of the sheet printed with indicia in registration. Adhesive is applied at preselected locations and the sheet is then folded before the adhesive sets aligning the adhesive locations. After the adhesive sets, the pieces are cut out. The final piece can be folded in a first position showing one face or side, opened to a second position showing a different face or side, opened to a third position showing still another different face or side, and finally opened to a fourth position showing another different face or side.

Another important object of the invention is that the within method of producing the novelty piece can be performed on conventional printing equipment eliminating costly hand labor and that the resulting novelty piece is ready to be used with no further fabrication or tearing of edges of the like by the ultimate user.

DESCRIPTION OF THE PREFERRED EMBODIMENT

Figure 1A:
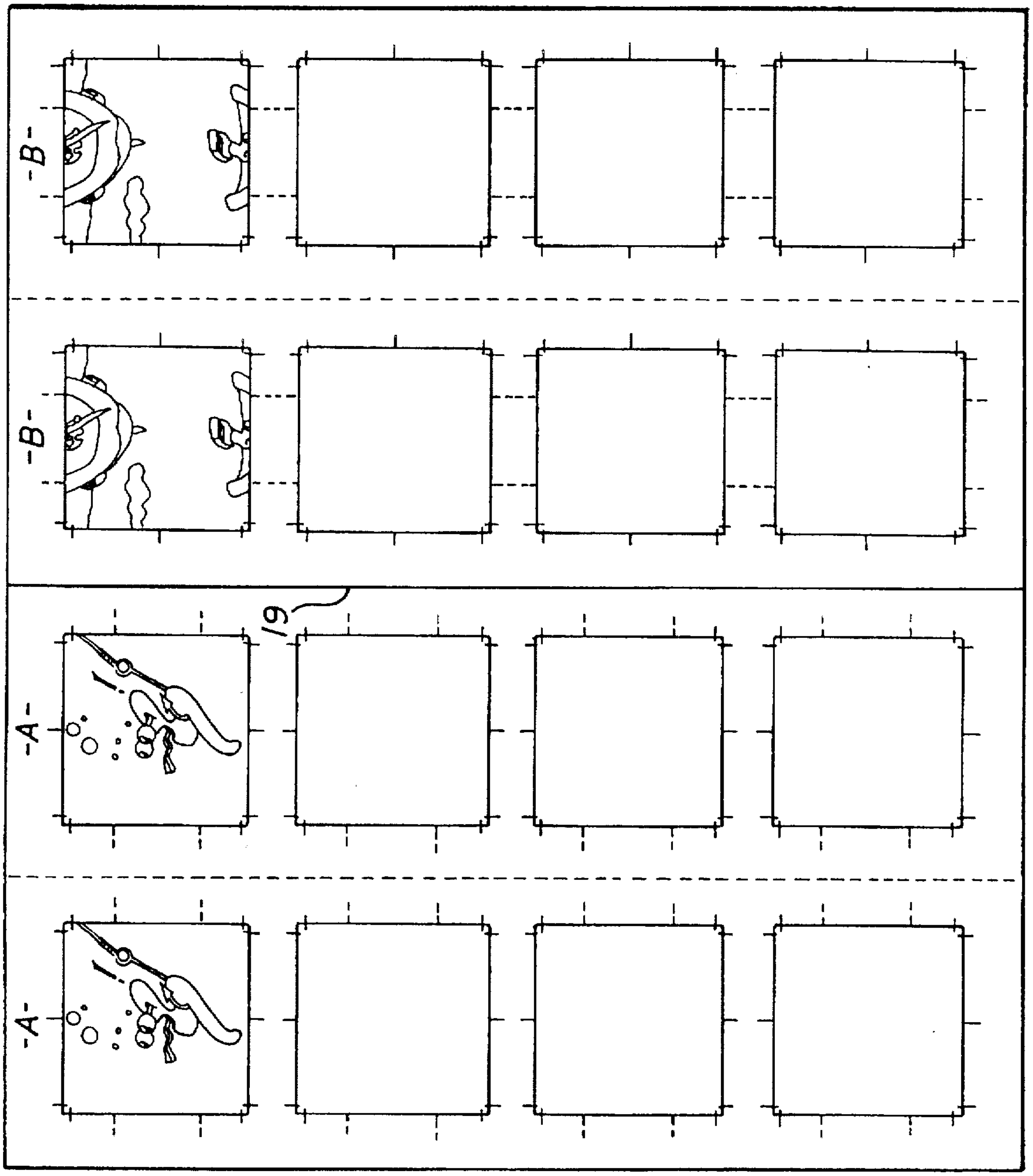
FIG. 1A is a plan view of the front side of a single sheet of cardboard or flexible substrate having two scenes or faces of the novelty piece of the invention printed thereon.

Referring now to FIG. 1A of the drawing, a single sheet 10 of cardboard or flexible printable substrate is shown having a plurality of vertical rows A and B thereon. Each row has a plurality of scenes thereon, all the scenes in one row, as row A, are here depicted as being identical. Thus, 2 different faces or scenes are shown in FIG. 1A. Only a single different scene is shown for convenience of illustration but it is to be understood that all the designs or scenes in one row, such as row A, are only identical if all novelty pieces produced from the same sheet are to be the same. Such scenes may be in black and white, or in color, printed on sheet 10 in any suitable manner. Although the term "sheet" has been used, sheet 10 may be a multilayered or a multiplied sheet with the indicia printed separately on a two single sheets of paper, then glued, laminated or otherwise adhered to a stiffer sheet of paper or cardboard.

Figure 1B:
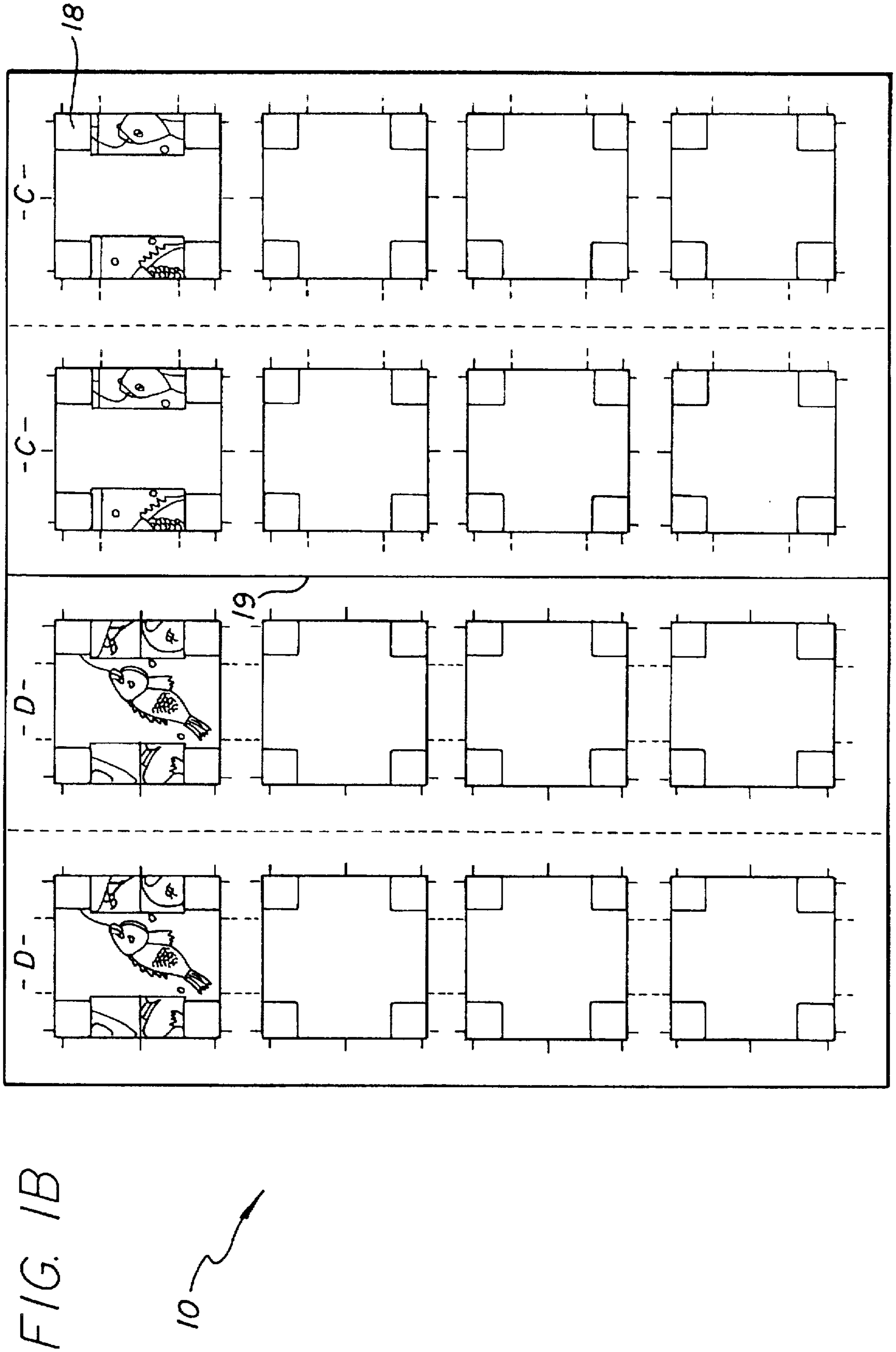
FIG. 1B is a plan view of the rear side of the single sheet of FIG. 1A showing the two scenes or faces which correspond and are in alignment with the two scenes or faces on the front side.

FIG. 1B shows the opposite or rear side of sheet 10 having a plurality of vertical rows of indicia C and D which are in alignment and registration with vertical rows of indica A and B on the front side shown in FIG. 1A.

Sheet 10 thus includes thereon all 4 faces, designs, indicia, or scenes that will be displayed in the single novelty piece being made as will be discussed hereinbelow.

Figure 2A:
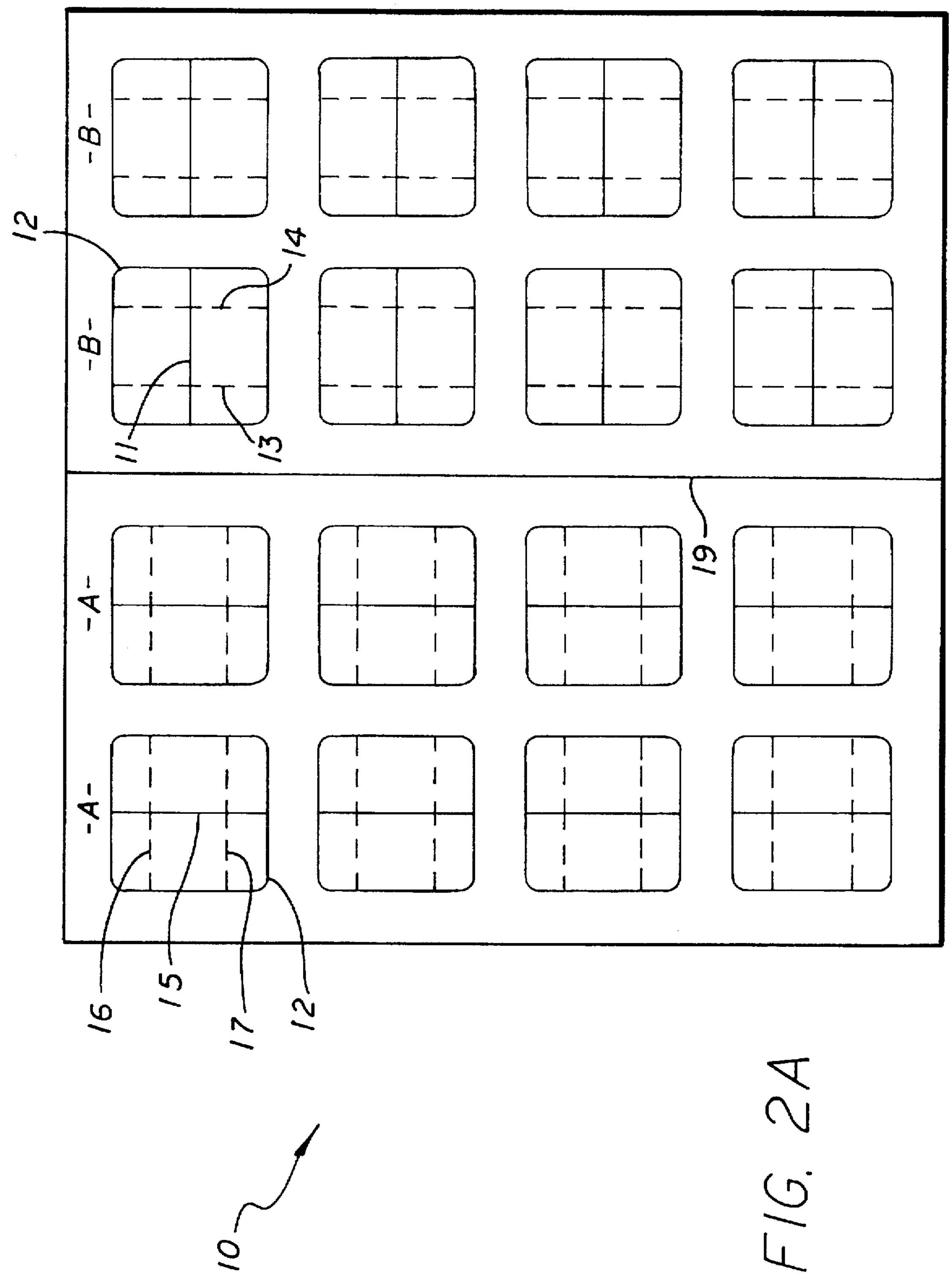
FIG. 2A is a graphical illustration of the front side of the sheet of FIG. 1A without indicia illustrating cutting and perforating thereof.
Figure 2B:
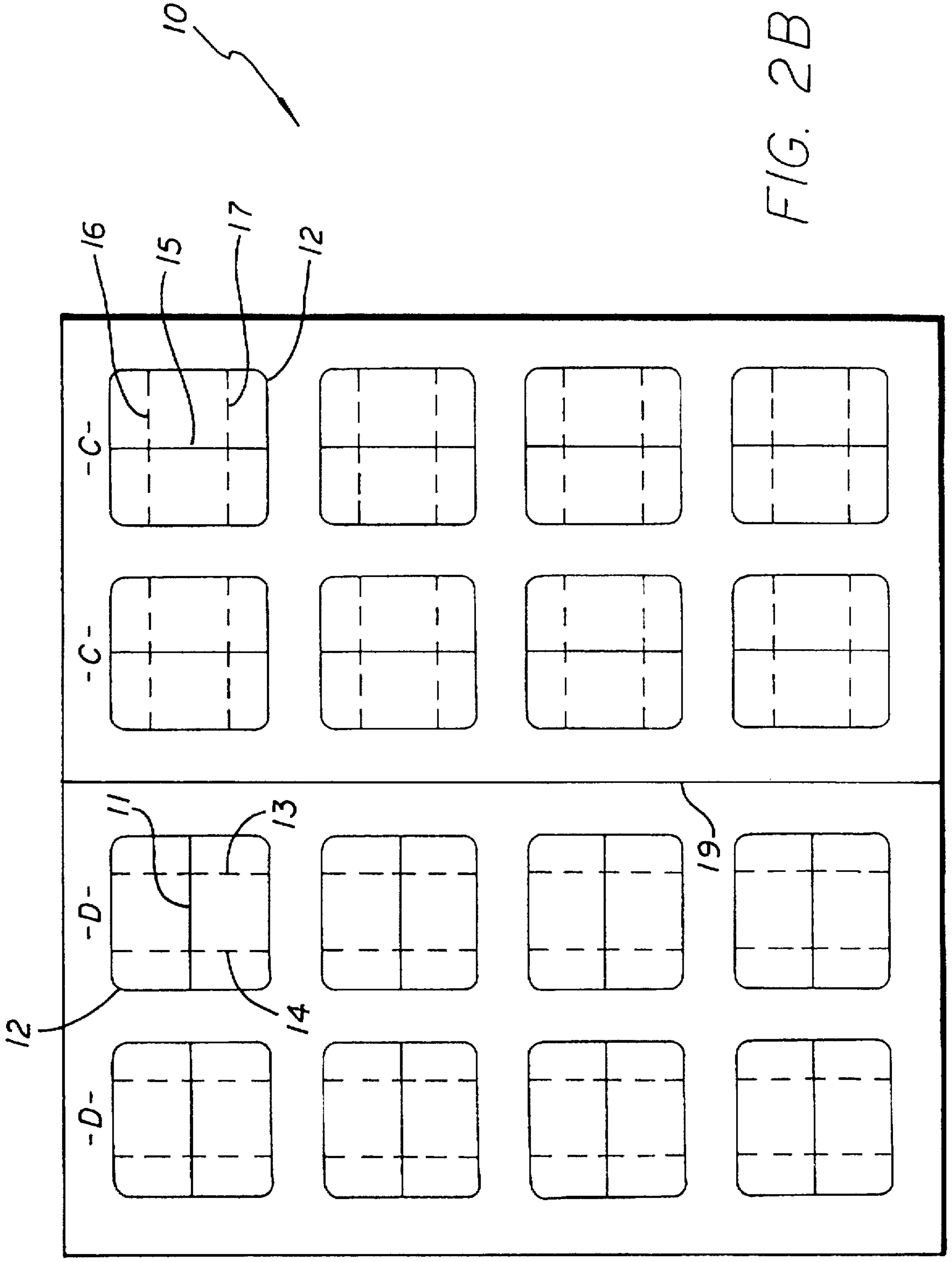
FIG. 2B is a graphical illustration of the rear side of the sheet of FIG. 1B without indicia illustrating cutting and perforating thereof.

As seen by referring collectively to in FIG. 2A and 2B, a plurality of vertical and horizontal die cuts are made through sheet 10. Die cuts 11 are made horizontally through the center of each scene 12 in rows B and D. Perforations 13, 14 are made perpendicular to die cut 11 and spaced about ¼" from each vertical edge of each scene 12. Each scene may be about 1½" to 1⅝" square. Of course, any suitable dimensions may be used. Die cuts 15 are made vertically through the center of each scene 12 in rows A and C. Perforations 16, 17 are made perpendicular to die cut 15 and again spaced about ¼" from each horizontal edge of each scene 12.

The die cut lines 11, 13, 14, 15–17 may extend beyond the edges of each scene 12; that is, in production; the die cuts and perforations may extend past the final trim size of the piece as shown FIG. 1A.

Sheet 10 is now folded along fold line 19 (FIGS. 1A and 2A) so that the indicia in rows A and B appear to the outside and the indicia in rows C and D being inside the fold are no longer visible. The inside surfaces of the folded sheet is then glued or otherwise adhesively affixed so when the sheet 10 is folded, row A which is in alignment and registration with row D and row B which is in alignment with row C will now all be in alignment and registration.

Figure 3:
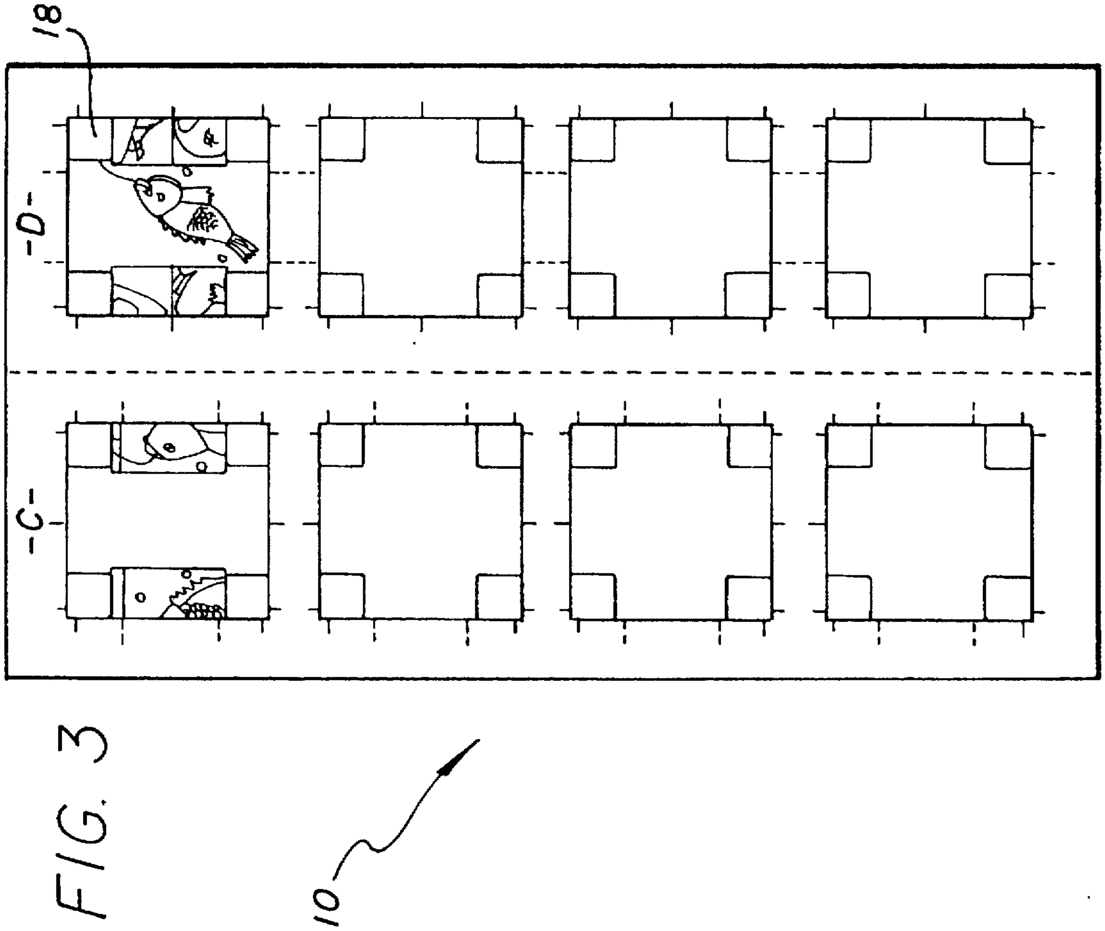
FIG. 3 illustrates the folded and glued position of the sheet of FIGS. 1A and 1B.

To accomplish the aforestated gluing in carrying out the instant invention, the glue or other suitable adhesive must be accurately applied at predetermined locations. As shown in FIG. 3, a glue square indicia 18 is provided in each corner of all of the scenes in rows C and D. A suitable adhesive is applied in each corner square 18 on at least one of the rows C or D prior to the aforestated folding about fold line 19 and upon folding, the mating glue corners 18 on rows C and D are in registration. The glue may be machine-applied by a number of well known techniques utilizing templates, special fixtures or printing technology.

Figure 4:
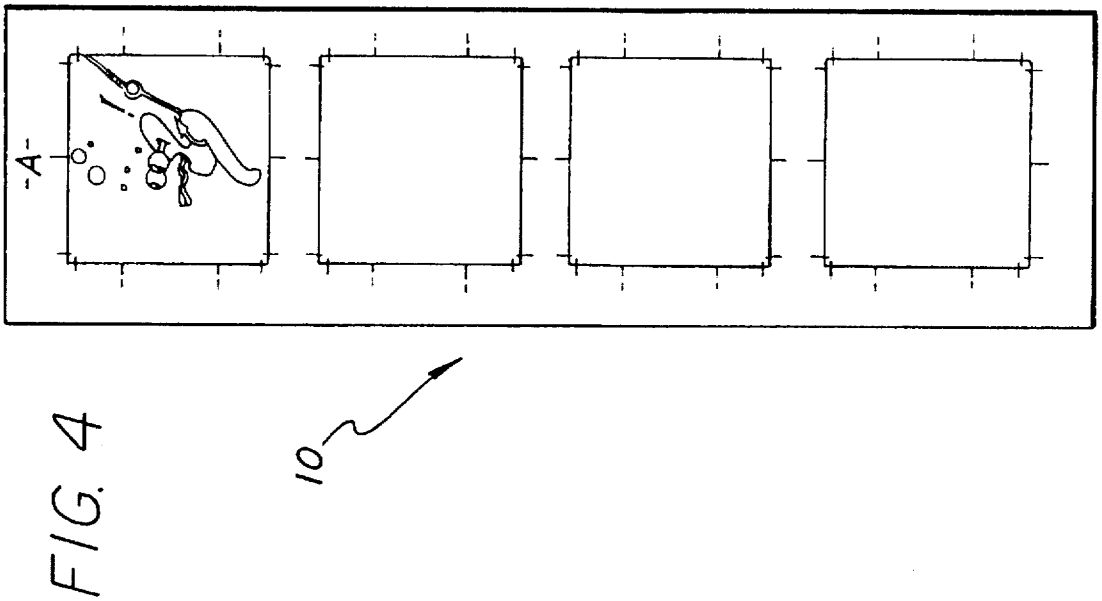
FIG. 4 illustrates the final folded and glued position of the sheet of FIGS. 1A to 3.

After the adhesive has set, only rows A and B are now the front and rear of the resulting folded and affixed sheet as depicted in FIG. 4 with row B being on the rear side not shown. The 4 layered and glued scenes are now die cut out from the 4 layered folded sheet 10 while ensuring that the vertical and horizontal pre-die-cut lines are in the exact center of the final piece.

Figure 5:
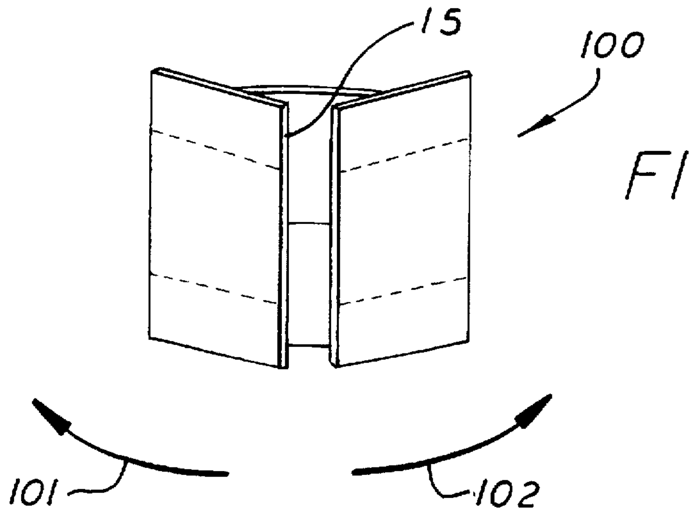
FIGS. 5, 7, 9, and 11 illustrate subsequent steps in the depiction of 4 different scenes of one of the pieces cut from the folded sheet of FIG. 4.
Figure 6:
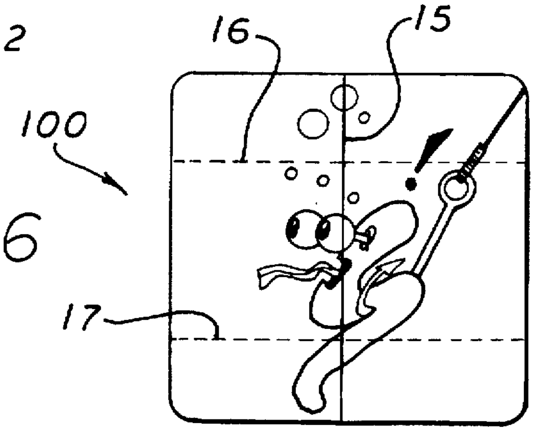
FIGS. 6, 8, 10, and 12 illustrate graphically the four differing scenes presented when the piece is folded as illustrated in FIGS. 5, 7, 9, and 11.
Figure 7:
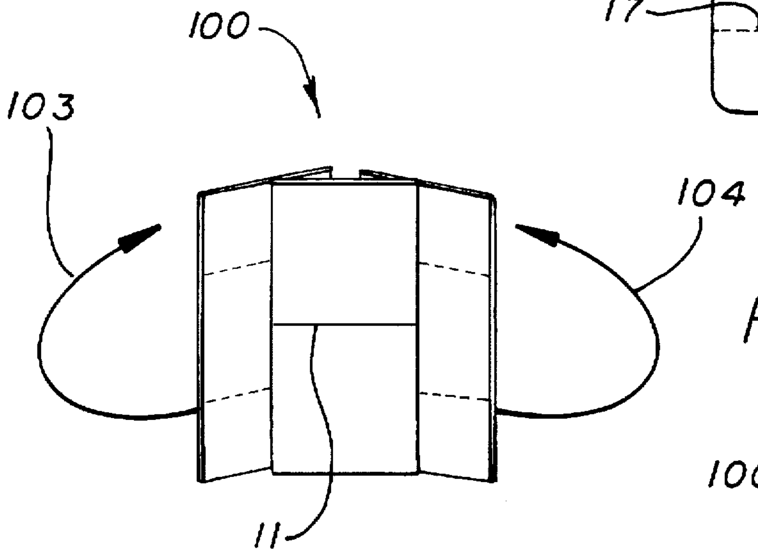

It is to be understood that the final piece (4 being formed from sheet 10 of the illustrated embodiment) is shown in FIG. 5. Piece 100 has a front face as seen in FIG. 6 die cut along line 15. Fold lines are formed along perforations 16, 17. Piece 100 thus presents the first scene seen in FIG. 6. Piece 100 is now opened via arrows 101, 102 (FIG. 5) to the FIG. 7 position shown by arrows 103, 104. This presents the second scene shown in FIG. 8. A horizontal die cut line 11 appears in the middle of the scene in FIGS. 7 and 8.

Figure 8:
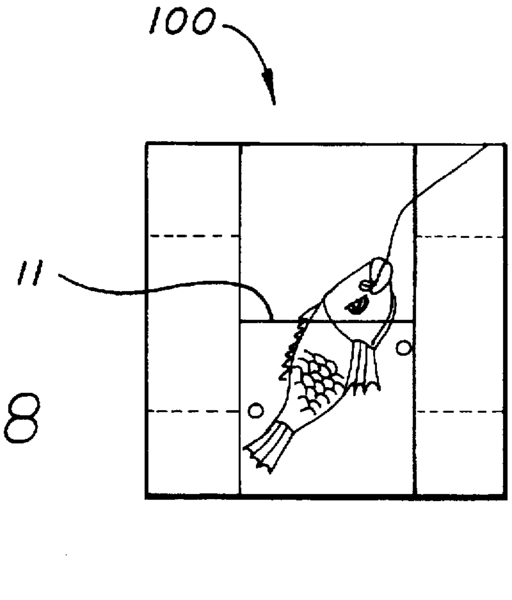
Figure 9:
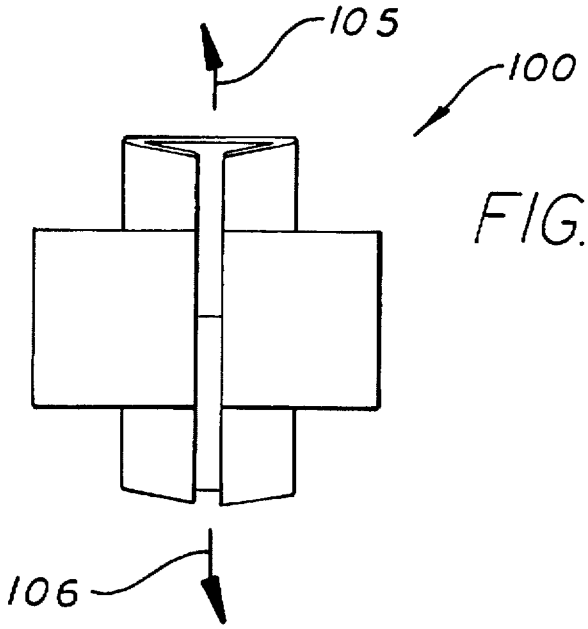
Figure 10:
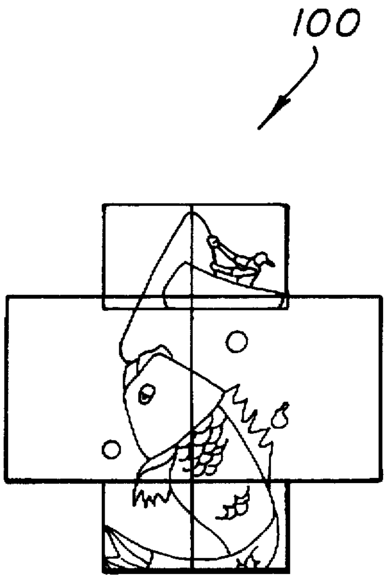

The upper portion of the piece, as seen in FIG. 8, is now moved in the direction of arrows 105, 106 (FIG. 9) forming the third scene shown in FIG. 10.

Figure 11:
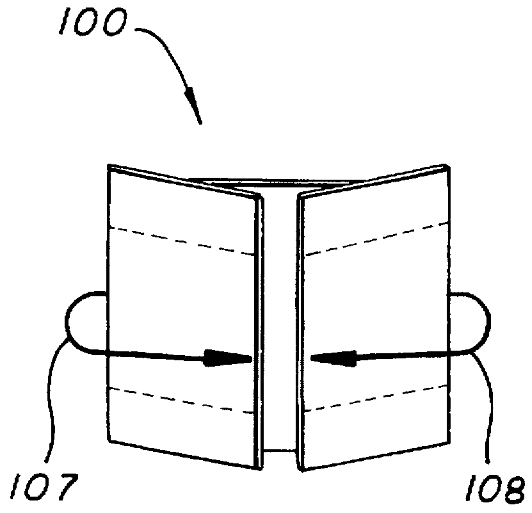
Figure 12:
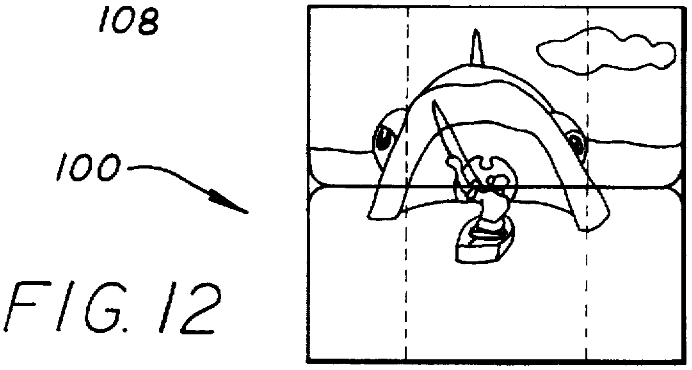

The piece 100, as seen in FIG. 10, is down opened in the direction of arrows 107, 108 (FIG. 11) presenting the fourth or final scene shown in FIG. 12.

Although each scene may be different, and have no relation to each other, it can be seen that, in FIG. 6, the worm character is on a hook spotting an approaching fish. In FIG. 8, the fish has swallowed the worm. In FIG. 10, the fish is being reeled in and, in FIG. 12, the fish comes to the surface and is shown as a huge man eating monster. Thus, a coherent 4 act scenario is provided.

There is thus described a multi-sided novelty piece and method for making the same. Obviously, variations thereof may occur to any artisan and the scope of the invention should only be considered to be limited by the scope of the appended claims. For example, it will be readily apparent to one skilled in the art that sets of different images can be produced on the same sheet and that the configuration of the novelty piece is not restricted to a rectangle but can be produced in many geometrical shape variations.

I claim:

1. A method for forming a multi-sided novelty piece comprising the steps of:

imprinting a first face having first indicia and a second indicia different from said first indicia on a sheet of flexible printable substrate spaced from said first indicia;

imprinting a second face on the opposite side of said sheet having a third indicia different from said first and second indicia and a fourth indicia different from said first, second, and third indicia wherein said first indicia is in alignment and registration with said third indicia and said second indicia is in alignment and registration with said fourth indicia;

cutting a first cut line through said first and third indicia substantially along the middle thereof creating two discrete cut-out portions of said indicia;

forming a pair of fold lines on opposite sides of said first indicia extending perpendicular to said first cut line;

cutting a second cut line through said second and fourth indicia substantially along the middle thereof creating two discrete cut-out portions of said sheet, said second cut line extending in a direction parallel to said first cut line;

forming a pair of fold lines in opposite sides of said second and fourth indicia extending perpendicular to said second cut line;

folding said sheet about a fold line extending between said first and second indicia and said third and fourth indicia and securing the resulting folded sheet in its folded position whereby the indicia on said first side is on the outer sides of said folded sheet and the indicia on said second side is on the inner sides of said folded sheet and all said indicia is in alignment and registration with each other;

cutting out said folded and secured first, second, third, and fourth indicia forming said piece.

2. In the method of claim 1 wherein the steps of imprinting said first, second, third, and fourth faces include the step of imprinting a plurality of each of said first, second, third, and fourth indicia in aligned vertical rows spaced from each other, and subsequently carrying out said steps of cutting, forming fold lines, folding said sheet, securing the folded sheet in the folded configuration and cutting out aligned first, second, third, and fourth faces in each of said aligned rows.

3. In the method of claim 1 wherein the step of securing the folded sheet includes the application of adhesive at predetermined locations at the corners of at least one indicia on the inner side of said folded sheet.

4. In the method of claim 1 wherein all of said indicia presents a plurality of interrelated scenes, said second indicia being said first scene, said second scene being a portion of the third and fourth indicia;

said third scene being a portion of the third and fourth indicia, and said fourth scene being said first indicia.

5. A method for presenting four discrete interrelated scenes on a novelty piece made from the method of claim 1 comprising the steps of:

presenting the first face of said piece illustrating said first indicia thereon as said first scene;

opening said first face at said cut line thereof exposing a portion of both said second and third indicia thereon as said second scene;

opening one portion of said second face upwardly at said cut line of said second face exposing a first portion of said third face;

opening a second portion of said second face downwardly away from said first portion of said second face at said cut line exposing a second portion of said third face, said opening of said portions of said second face, and said third face forming said third scene; and opening said third face about the cut-line thereof exposing said fourth face, said fourth indicia forming said fourth scene.

* * * * *